March 13, 1962 H. BERGER ETAL 3,025,402
RADIANT ENERGY CONTROL
Filed June 22, 1955 4 Sheets-Sheet 1

INVENTORS:—
HAROLD BERGER
FRANKLYN E. FAIRMAN
BY:—
Junius F. Cook, Jr.
ATTORNEY

March 13, 1962
H. BERGER ETAL
3,025,402
RADIANT ENERGY CONTROL
Filed June 22, 1955
4 Sheets-Sheet 2
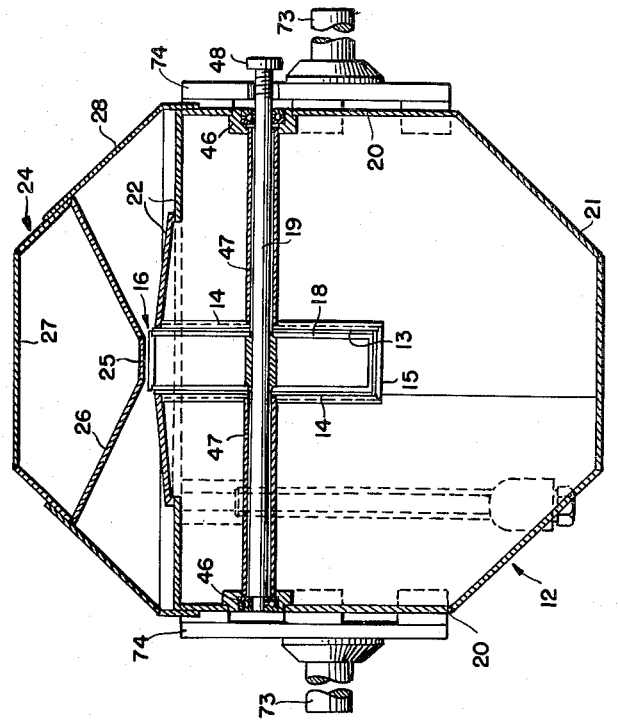
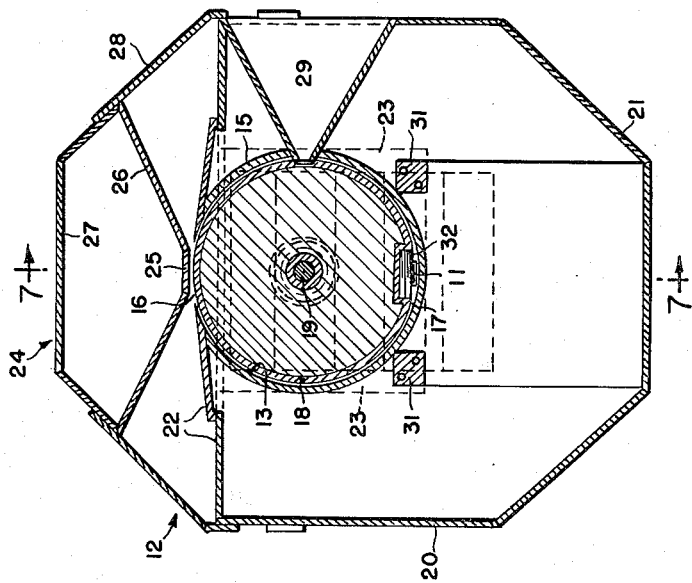
INVENTORS:—
HAROLD BERGER
FRANKLYN E. FAIRMAN
BY:—
Junius F. Cook, Jr.
ATTORNEY March 13, 1962 H. BERGER ETAL 3,025,402
RADIANT ENERGY CONTROL
Filed June 22, 1955 4 Sheets-Sheet 3
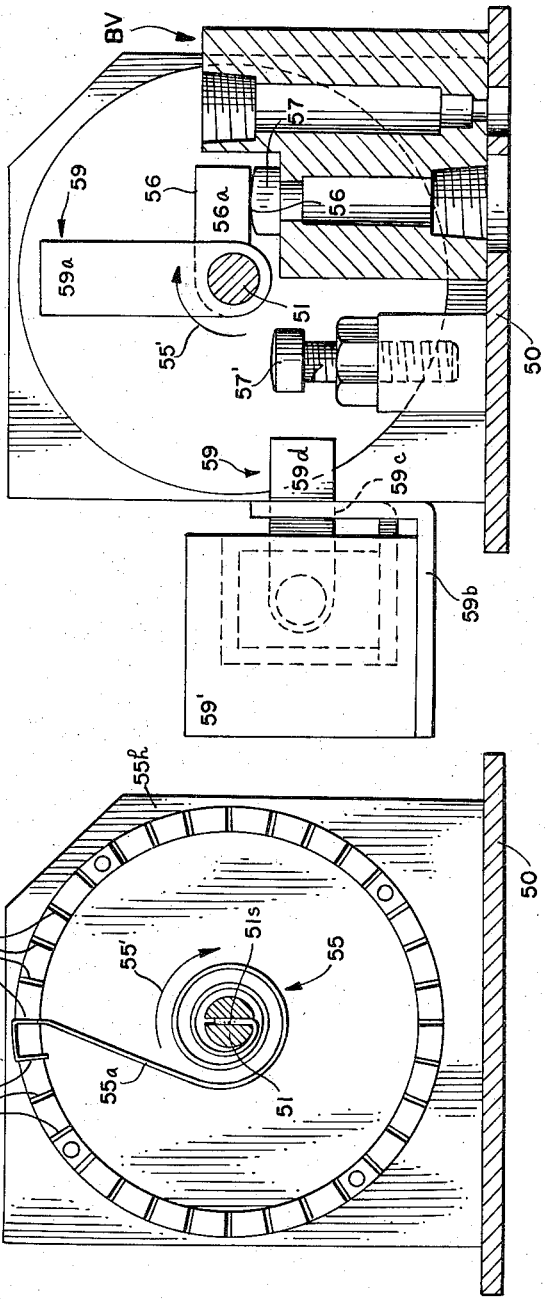
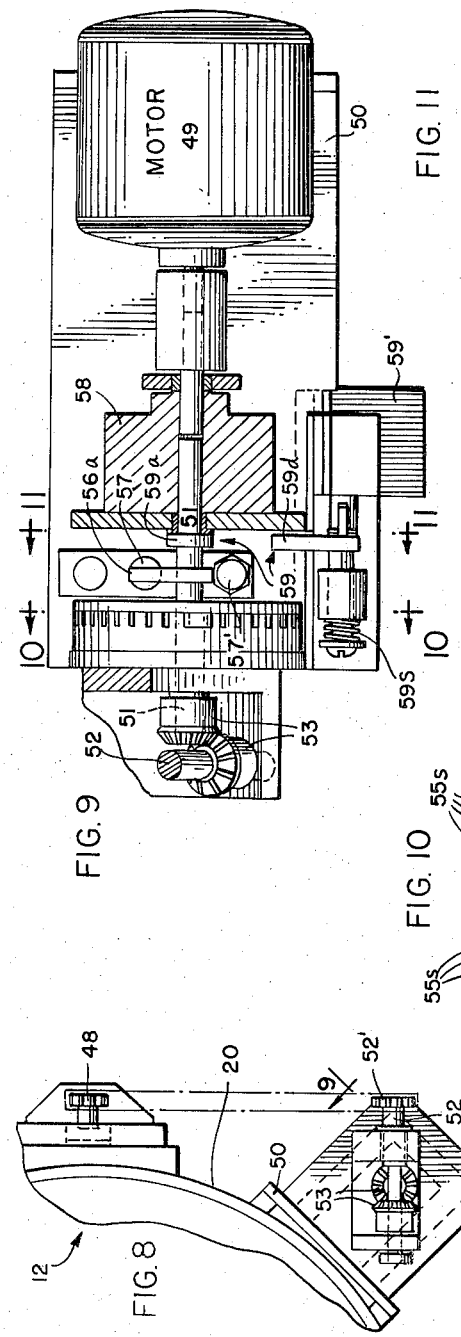
INVENTORS:-
HAROLD BERGER
FRANKLYN E. FAIRMAN
BY:-
ATTORNEY

INVENTORS:—
HAROLD BERGER
FRANKLYN E. FAIRMAN
BY:—

ATTORNEY

United States Patent Office 3,025,402
Patented Mar. 13, 1962

3,025,402
RADIANT ENERGY CONTROL
Harold Berger, West Allis, and Franklyn E. Fairman, Milwaukee, Wis., assignors to General Electric Company, a corporation of New York
Filed June 22, 1955, Ser. No. 517,118
14 Claims. (Cl. 250—106)

The present invention relates in general to the control of radiant energy, and has more particular reference to means for controlling the delivery of radiant energy from an energy emission source, the invention pertaining especially to apparatus comprising housing means for enclosing a radiant energy source and selectively adjustable to shield the source completely against emission of radiant energy, outwardly of the housing means, and to permit delivery of radiant energy from said source outwardly of the housing in the form of a ray beam of controlled configuration.

Sources of radiant energy, such as radium, as well as materials, including cobalt, cesium and iridium, which have been exposed to radiation in order to render the same radioactive, may be employed for radiographic, therapeutic and other useful purposes by suitably controlling the delivery of radiant energy from such sources in the form of ray beams of controlled configuration.

An important object of the present invention, accordingly, is to provide apparatus forming housing means for enclosing a source of radiant energy comprising a body of radioactive material, the apparatus being conditionable to shield the source effectively against the delivery thence of radiant energy outwardly of the housing means, the apparatus being also adjustable to present the energy source in position to emit a beam of radiant energy of desired sectional configuration outwardly of the housing means, as for radiographic, therapeutic or other useful purpose.

Another important object is to provide an apparatus of the character mentioned which may be selectively adjusted to provide for the emission of radiant energy beams having any desired one of a number of different configurations; a further object being to provide apparatus which may be conditioned to permit emission from the energy source of a conical ray beam of desired diverging angularity; a further object being to provide apparatus which may be conditioned to control emission from the energy source of a beam comprising rays emanating from the source in all directions radially thereof within a divergent zone of desired angularity on opposite sides of a plane extending diametrally through the source.

Another important object is to provide energy control apparatus of the character mentioned wherein the apparatus is normally held in safe condition in which the energy source is shielded completely against emission of rays outwardly of the source housing; a further object being to provide means operable to adjust the apparatus to condition the same for radiant energy ray emission outwardly of the housing means; a still further object being to incorporate warning signal means for visually or audibly denoting that the equipment is in condition permitting the emission of radioactive ray beams.

Another important object is to provide a fail-safe feature in apparatus of the character mentioned, whereby the equipment will return to source shielding condition, as distinguished from beam emitting condition, in the event of failure of any control means associated with the apparatus and operable to condition the same for ray beam emission.

Another important object resides in the provision of mobile carriage means in which the apparatus of the present invention may be conveniently cradled and supported.

Another important object is to provide apparatus of the character mentioned embodying a housing structure that is substantially impervious to energy rays emitted by a radiant energy source within the housing, the housing having a turnable member forming a housing closure carrying the radiant energy source, so that, by shifting the turnable member, the energy source supported thereon may either be disposed in completely shielded position, within the housing, or may be alined with portals, formed in the housing and through which radiant energy beams of desired configuration may be emitted outwardly of the housing; a further object being to provide yielding means normally urging the shiftable member in the housing toward a position in which the radiant energy source on the shiftable member is shielded, by said member and the associated housing, against ray emission outwardly thereof.

Another important object is to provide apparatus of the character mentioned comprising a ray impervious housing and a shiftable energy source carrying member forming a closure member on the housing, wherein the housing and shiftable member comprise hollow fabricated structures, as of sheet metal, filled with material, such as lead, which is substantially impervious to penetrating rays emitted by radioactive energy sources of the sort adapted to be housed in the apparatus of the present invention.

Another important object is to provide improved power transmission means operable to selectively turn and hold the shiftable source carrying member in desired positions of adjustment in the housing structure; a further object being to provide a transmission system embodying an electric motor, a magnetic clutch and a solenoid for selectively shifting, latching and releasing the source carrying member in beam emitting positions in the housing structure.

Briefly stated, in accordance with one aspect of the invention, a radiant energy source comprising a disc of radioactive metal, such as cobalt, cesium or iridium, may be secured in a seat at the edge or rim of a preferably cylindrical carrying member turnably mounted in a corresponding cavity or pocket formed in a housing structure, said cavity extending from the center of the housing structure to an opening at a side thereof. The housing structure and the carrying member may comprise hollow casings completely filled with material, such as lead, which is impervious to energy rays of the sort emitted by the radioactive disc. Accordingly, when the carrying member is in position supporting the disc at the center of the housing structure, the radiant energy source provided by the disc will be totally enclosed, by and between the housing structure and the carrying member, and hence shielded against the emission of radiant energy outwardly of the housing structure. The housing structure may also be formed with a preferably conical port, which may be normally closed by a correspondingly configurated plug of ray impervious material, so that, a conical ray beam may be emitted, through said port, by removing the plug therefrom and by turning the carrying member to dispose the energy source in alinement with the port. By turning the source carrying member to present the radioactive disc at the side of the housing structure, the source may be entirely exposed for ray beam emission in all directions radially of the source and on one side of a diametral plane therethrough; and the housing structure may be provided with a hood for confining the emission of the energy source to any desired extent when the same is in such exposed position. Biasing means may be associated with the carrying member and the housing structure to normally urge the carrying member toward a safe position in which the energy source is disposed at the center of the housing structure, in completely shielded position. Selectively operable drive means may also be provided for turning the carrying member from source shielding position to, and for latching the same in, any one of the several beam emitting positions of the apparatus.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings:

FIG. 6 is an enlarged sectional view taken substantially along the line 6—6 in FIG. 3;

FIG. 7 is a sectional view taken substantially along the line 7—7 in FIG. 6;

FIG. 8 is a sectional view taken substantially along the line 8—8 in FIG. 4;

FIG. 9 is an enlarged sectional view taken substantially along the line 9—9 in FIG. 8;

Figure 12:
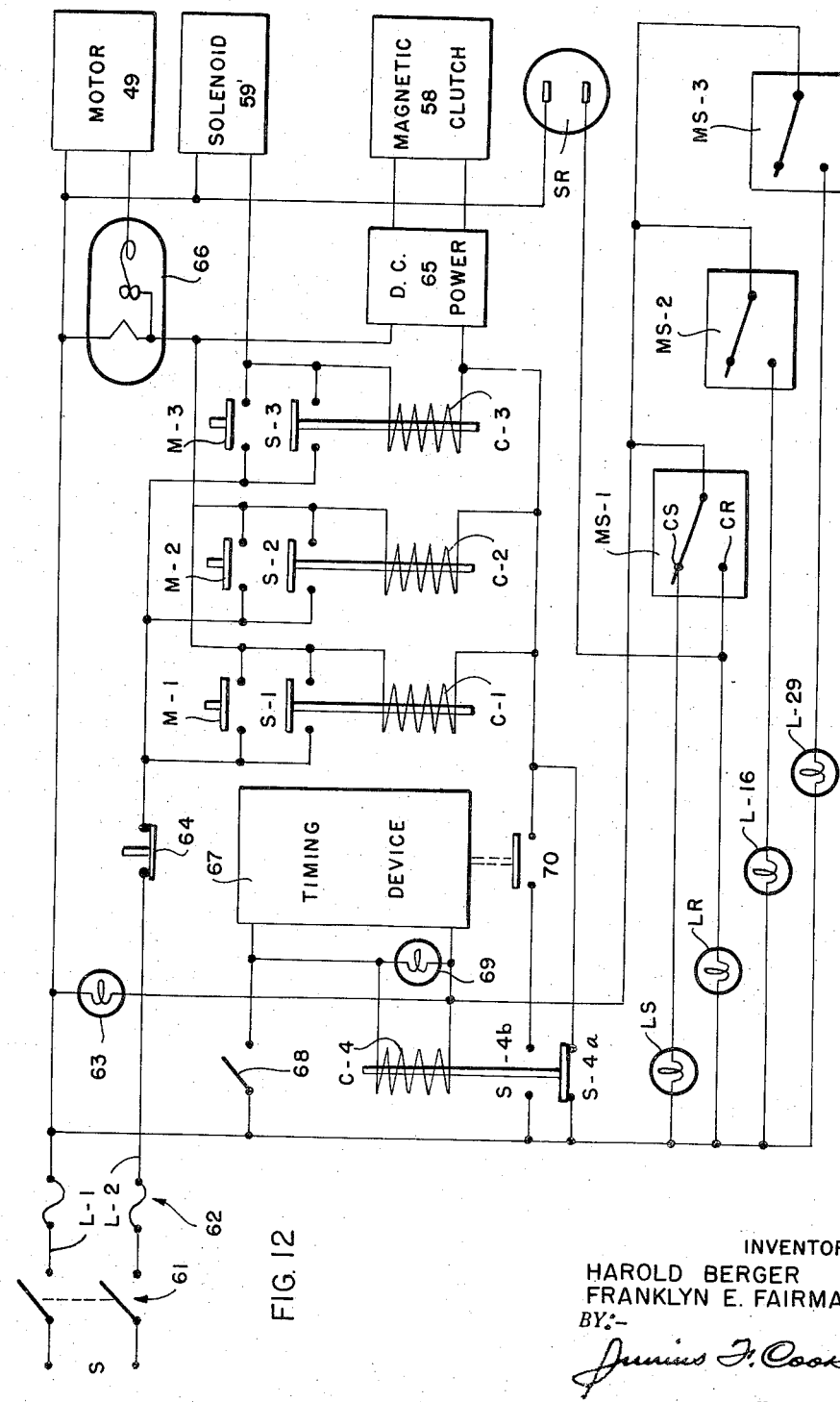

FIGS. 10 and 11 are sectional views respectively taken substantially along the lines 10—10 and 11—11 in FIG. 9; and FIG. 12 is a circuit diagram of an electrical control system which may be provided for actuating the apparatus of the present invention.

To illustrate the invention, the drawings show apparatus for controlling the emission of radiant energy from an energy source 11, such as a body of radioactive cobalt, cesium, iridium, or other radioactive material. As shown, the apparatus may comprise a housing structure 12 formed with a preferably cylindrical cavity or pocket 13 having spaced, relatively flat end walls 14 and a peripheral wall 15, the cavity extending at one side thereof substantially at the center of the housing structure 12, the opposite side of the cavity coinciding with and opening at an outer or boundary wall of the housing structure, as at a portal forming opening 16.

The source 11 may be supported within the housing structure 12 upon a seat 17 formed at the rim of a preferably cylindrical carrying member or wheel 18, turnably supported within the cavity or pocket 13, as on an axle 19 journaled in suitable bearings formed in the housing structure 12. By turning the axle 19, the wheel 18 may be turned in the pocket 13 to dispose the source 11 either in retracted position substantially at the center of the housing structure or in projected position opposite any other portion of the peripheral wall of the pocket 13; or the energy source 11 may be positioned at the opening 16 and thus exposed outwardly of the housing.

The housing structure 12 may conveniently comprise a hollow fabricated casing formed of sheet metal, such as steel, the casing, as shown, having a cylindrical side wall 20, a preferably truncated, conical bottom wall 21, and means forming a slightly dished top wall 22 containing the opening 16, the sheet metal portions defining the cavity 13 being suitably supported and braced on the housing wall portions 20, 21 and 22, as by suitable suspension means 23. Above the dished wall 22, the housing structure 12 may support a hood 24 immediately above and outwardly of the opening 16, said hood preferably comprising a hollow, sheet metal member having a bottom wall 25 disposed opposite the opening 16, a conical wall 26 diverging outwardly and upwardly of the wall 25, and a cover wall 27 enclosing the space above the walls 25 and 26. The hood 24 may be supported on the housing structure 12 in any suitable or preferred fashion, as by means of a conical mounting collar 28 of material, such as aluminum, which is substantially transparent to rays of the sort emitted by the source 11.

The housing structure 12 may also be formed with an outwardly flaring, conical ray port 29, opening at its inner end into the chamber 13 through the peripheral chamber wall 15, said inner end of the port 29 being displaced about the axis of the chamber 13 substantially 90° with respect to the portal or opening 16. The outer end of the conical port 29 may open upon the side wall 20 of the housing structure. Means comprising a conical plug 30, adapted to snugly fit the port 29, may be provided for normally closing the same. By removing the plug 30 and by turning the wheel 18 to register the energy source 11 with the inner end of the port 29, a conical ray beam may be emitted from said source outwardly of the housing structure 12 through the port 29.

The turnable source supporting member or wheel 18, like the housing structure 12, preferably comprises a hollow member fabricated of sheet metal, such as steel. In order to control source emitted rays, the hollow wheel forming element 18 and the space defined within the housing structure 12, outwardly of the wheel pocket 13, together with the hollow hood 24, may be completely filled with material, such as lead, or other substance substantially impervious to penetration by rays of the sort emitted by the source 11. As a consequence, when the source carrying wheel 18 is disposed in position presenting the source 11 substantially at the center of the housing structure, that is to say, on the side of the axle 19 diametrically opposite from the opening 16, the energy source will be totally surrounded by a relatively thick mass of ray impervious material forming a shield, which will prevent emission of rays from the source outwardly of the housing structure. In order to improve such shielding effect, the support structure 23 may embody tungsten alloy bars 31 disposed on opposite sides of the source when in shielded position at the center of the housing structure.

Figure 1:
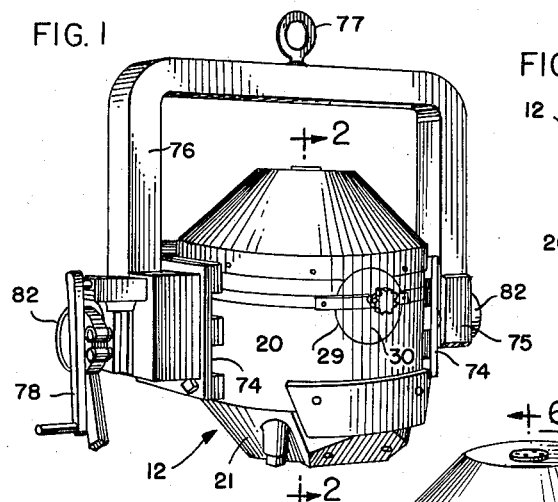
FIG. 1 is a perspective view of apparatus embodying the present invention.
Figure 2:
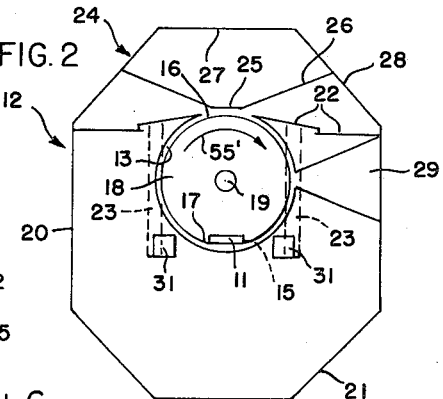
FIG. 2 is a sectional view of diagrammatic character taken substantially along the line 2—2 in FIG. 1.
Figure 3:
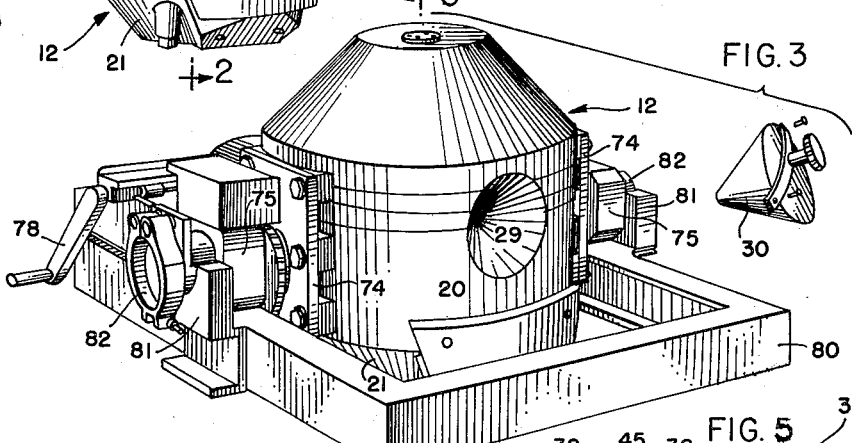
FIG. 3 is a perspective view of the apparatus, shown in FIG. 1, illustrating the same in position supported tiltably on a carrying frame.
Figures 4, 5:
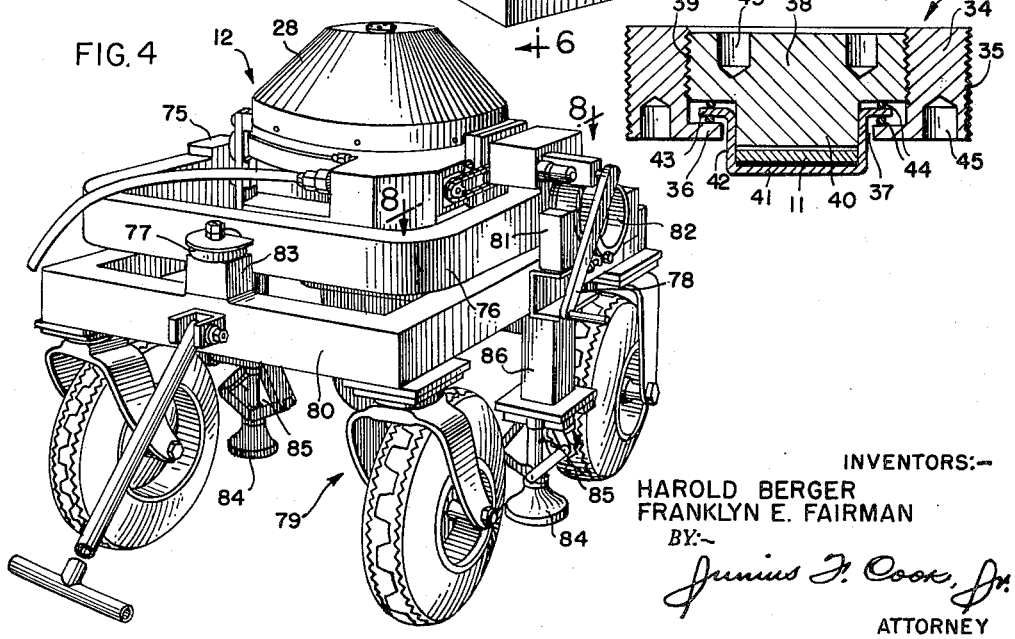
FIG. 4 is a perspective view of the apparatus, shown in FIG. 3, illustrating the same in position mounted on a mobile carriage.
FIG. 5 is a sectional view taken through a mounting structure for securing a disc of radioactive material as a radiant energy source in the apparatus of the present invention.

In order to support the source disc 11 on the seat 17, the wheel 18 may be formed with a preferably screw threaded socket 32 opening upon the seat 17 and adapted to threadingly receive a mounting assembly 33 of the sort shown in FIG. 5. The assembly 33 may conveniently comprise a preferably cylindrical mounting member 34 having an outer screw threaded surface 35 adapted for threading engagement in the threaded socket 32. The cylindrical mounting member may also be formed with an inwardly etxending, circular flange 36 defining a central opening 37 at one end of the member 34. The assembly 33 may also include a clamping plug 38 having cylindrical, screw threaded portions 39 formed for threaded connection with correspondingly threaded interior surfaces of the member 34 adjacent the flange 36. The plug may be formed with an end portion 40 adapted to extend within the opening 37 when the plug is threadingly connected within the member 34. The source disc may be supported in a mounting cup 41, carried by the members 34 and 38.

The cup 41 preferably is formed of relatively thin sheet material, such as stainless steel, which is substantially transparent to rays of the sort emitted by the energy source disc 11, and which will resist diffusion therethrough of the source material. The cup 41 is preferably formed with a flat bottom and integral, upstanding side walls 42, adapted to fit freely within the opening 37. Outstanding flange or lug means 43 may be formed on the side walls of the cup remote from the bottom wall, in position to overlie the flange 36 when the cup 41 is disposed in the opening 37. The cup may be sized to snugly receive the source disc 11, in position resting upon the bottom of the cup; and the parts may be clampingly secured together as an assembly unit by applying the source disc containing cup 41 in the opening 37 with the flange 43 overlying the flange 36, and by screwing the plug 38 within the member 34 to clamp the flange 43 against the flange 36, sealing gaskets 44, preferably comprising lead wire, being applied on opposite sides of the outstanding flange 43. In order to aid in clamping the member 34 and clamping plug 38 together, the same may be provided with sockets 45 for the accommodation of wrench-like tools employed for screwing the parts together or for uncoupling the same. The sockets 45 of the member 34 may also be employed to facilitate the application of the assembly unit 33 in mounted position in the threaded seat 32 of the wheel 18.

It will be seen from the foregoing that the disc 11 will be held within the cup 41 firmly between the flat bottom thereof and the disc facing end of the plug portion 40; and, when the unit 33 is mounted in the wheel 18 the disc 11 will be presented at the seat 17 outwardly of the clamping members 34 and 38, in position enclosed on the wheel 18 only by the ray transparent bottom and bottom adjacent portions of the side walls of the cup 41.

In order to provide for turning the wheel mounted energy source within the housing 12, the wheel 18 may be splined or otherwise fixed upon the shaft 19 to turn therewith; and the shaft may be turnably supported in journals 46, preferably mounted on the outer housing wall portion 20 on opposite sides of the housing, the shaft 19 being enclosed within tubular shaft receiving sleeves 47 which extend between the housing walls 20 and the end walls 14, which define the wheel chamber, said sleeves 47, at their opposite ends, being sealed each to an end wall 14 and to the housing wall 20. The shaft 19, at one end, may extend outwardly of the housing wall 20, and means, such as a wheel 48, may be provided on said outwardly extending end of the shaft for turning the same and the source carrying wheel from outwardly of the housing 12.

Any suitable means, of course, may be provided for turning the shaft. As shown, the shaft turning means may conveniently comprise an electric motor 49 mounted on a bracket plate 50, which may be conveniently secured on and outwardly of the housing side wall 20, suitable means being provided for drivingly connecting the motor 49 to turn the shaft 19. To this end, as shown, the bracket 50 may carry a drive shaft 51 and countershaft 52 journaled in suitable bearing means supported on the bracket 50. The drive and countershafts may be drivingly connected, as by means of bevel gears 53, and the countershaft may be drivingly connected with the wheel shaft 19, as by means of a chain 54 drivingly interconnecting a wheel 52' on the countershaft with the wheel 48 on the shaft 19. Spring means 55 may be provided for normally urging the shaft 19 to turn in one direction, as indicated by the arrow 55', and interfitting stop means 56 and 57 may be provided for limiting the turning movement of the shaft 19 in said direction to stop the same in retracted position, in which the source 11 is presented at the medial portions of the housing 12 in completely shielded position on the side of the shaft diametrically opposite the opening 16.

Magnetic clutch means 58 may be provided for selectively connecting the motor 49 to drive the shaft 51, against the influence of the spring means 55, and stop means 59 actuated by a solenoid 59' may be provided for stopping the mechanism in projected position presenting the source 11 in registration with the ray emission port 29. Interfitting stop means 56' and 57' may also be provided for limiting the motor driven turning movement of the shaft 19 to stop the same in projected position presenting the source disc at the opening 16. If desired, the spring means 55 and the interfitting stops 56, 56', 57, 57' and 59 may be operatively associated directly with the shaft 19, in any convenient or preferred location, as at the opposite ends thereof, where the same extend outwardly of the housing structure 12. As shown, however, the same are preferably drivingly associated with the shaft 51 on the bracket plate 50, the shaft 51 being drivingly connected to turn in unison with the shaft 19. To this end, the spring means 55, as shown more particularly in FIG. 10, may comprise a strip 55a of spring steel having one end secured in a diametral slot 51s formed in the shaft 51, said strip extending thence spirally outwardly of the shaft, and being fastened at its outer end to the bracket plate 50, as by attaching the same in any selected one of a number of angularly spaced slots 55s formed in the rim of a preferably cylindrical spring housing 55h secured on the bracket plate 50 in position encircling the shaft. The spring means 55 thus is attached to the shaft 51 in fashion normally urging the same in a direction to turn the wheel 18 toward the retracted position determined by the interengagement of the stops 56 and 57.

As shown more particularly in FIG. 11 of the drawings, a radial arm 56a, providing the stop means 56 and 56', may be pinned or otherwise securely fastened on the shaft 51 in position to engage the stop means 56 with the stop means 57 when the wheel 18 is in retracted position, the stop means 57 preferably comprising an oil cushioned stud mounted in a buffer valve structure BV secured on the plate 50. The arm 56a may also be arranged to stoppingly engage the stop means 56' with the stop means 57' when the wheel 18 is in position presenting the source 11 at the portal 16, said stop means 57' preferably comprising a threaded stud adjustably secured in a threaded embossment or pedestal carried on the bracket plate 50. The threaded stud may provide a head for engagement with the stop means 56' and is preferably adjustable in the embossment, a lock nut being preferably provided for securing the same in adjusted position.

The solenoid actuated stop means 59 may comprise a radially extending arm 59a fastened on the shaft 51 to turn therewith adjacent the arms 56a. The stop means 59 may also embody a detent arm 59d turnably supported in suitable bracket means 59b carried on the plate 50, the arm 59d being normally urged, as by means of a spring 59s, toward retracted position outwardly of the path of turning movement of the arm 59a. The solenoid 59', when energized, may serve to project the arm 59d against the influence of the spring 59s into position in the path of the arm 59a and against a support shoulder 59c on the bracket means 59b. The shoulder 59c serves to support the arm 59d in position to engage the arm 59a and thereby stop projecting movement of the wheel 18 when the same is in position presenting the source 11 at the portal 16.

By energizing the magnetic clutch means 58 to connect the motor 49 with the shaft 51, and by simultaneously energizing the motor 49, the wheel 18 may be rotated against the influence of the spring 55 in a direction to position the source disc 11 either in registration with the emission port 29, or at the portal 16. Continued operation of the motor after interengagement of the stop means 59a and 59d, when the source is in registration with the port 29, or after interengagement of the stop means 56' and 57' when the source is disposed at the portal 16, will merely result in slippage of the magnetic clutch 58. The motor may be disabled after the wheel has reached either of its projected positions. Thereafter, the wheel may be held in projected ray emitting position for as long an interval as may be desired by continuing the magnetic clutch 58 in operation to anchor the wheel 18 to the stopped motor. In the event of power failure, or upon expiration of a ray emitting interval, the clutch 58 may be released, thereby permitting the spring biased wheel 18 to return the source to completely shielded position within the housing 12.

To control the operation of the motor, solenoid and magnetic clutch, an electrical control system 60, as shown in FIG. 12, may be provdied. The system may be energized through power supply conductors L–1 and L–2, adapted for connection with a suitable source S of electrical energy, as through a conventional line switch 61, overload protective devices 62, of any suitable or preferred character, being provided in the supply line conductors, which may also be connected with a pilot light 63 for showing the energized condition of the line. The system 60 may comprise a plurality of normally open relay switches S–1, S–2 and S–3, adapted to be closed whenever associated relay coils C–1, C–2 and C–3 are energized. These relay coils are interconnected in parallel relationship between the line conductors L–1 and L–2 through corresponding, normally, open, manually operable switches M–1, M–2 and M–3.

To this end, the coils C–1, C–2 and C–3 may be interconnected together and with the line conductor L–2 through a normally closed relay switch S–4a. The coils C–1, C–2 and C–3 are, respectively, connected with the switches S–1, S–2 and S–3 and with the switches M–1, M–2 and M–3, the sides of said switches remote from the coils being all interconnected with the line conductor L–1 through a normally closed control switch 64. The switches M–1, M–2 and M–3, accordingly, are each connected in parallel relation with the corresponding relay switches S–1, S–2 and S–3 so that by closing the manually operable switches to energize the relay coils, the relay switches will be closed to energize the relay coils after the release and consequent opening of the manually operable switches, the relay switches remaining closed so long as the control switch 64 also remains in closed condition.

The coil connected sides of the switches M–1, S–1, M–2 and S–2 are all connected with one side of rectifying means forming a D.C. power source 65, the other side of which is connected with the line conductor L–2 through the normally closed relay switch S–4a. The D.C. power source 65, accordingly, will become energized for operation in response to the closure of either of the manually operable switches M–1 and M–2 and will remain in operation thereafter so long as either of switches S–1 or S–2 remain closed under the control of the switch 64.

The magnetic clutch 58 is electrically connected with the D.C. power source and will, consequently, be actuated in response to the closure of either of switches M–1 and M–2; and the clutch will continue in operation thereafter so long as the switch 64 remains closed. The switches M–1, M–2, S–1 and S–2 also serve to control the operation of the motor 49 through a time delay relay 66 of a sort providing a normally closed switch adapted to open after the expiration of an interval of desired duration following the commencement of the delivery of electrical energy through the relay to the motor. To this end, the relay may be connected between the line conductors L–1 and L–2 through the motor 49, the switch 64, and one or another of the switches M–1, S–1 or M–2, S–2.

The coil connected side of the switches M–3 and S–3 may be connected with the line conductor L–2 through the solenoid 59′, whereby to actuate the solenoid in response to the closure of the switch M–3 and to maintain the solenoid in operation thereafter so long as the switch S–3 remains closed under the control of the switch 64. The manually operable switches M–2 and M–3 are mechanically interconnected to close in unison so that upon closure thereof the motor 49, the magnetic clutch 58 and also the solenoid 59′ will be simultaneously actuated to turn the wheel 18 into position presenting the energy source 11 in registration with the ray emission port 29, operation of the solenoid serving to stop the wheel 18 when it reaches the desired position. The closure of the switch 61, however, will result only in the actuation of the motor 49 and the magnetic clutch 58 for the purpose of turning the wheel 18 to present the energy source disc 11 at the opening 16, the solenoid 59′ remaining inactive during such operation of the wheel turning apparatus.

The equipment may also include indicating means for showing the relative turned position of the wheel 18 within the housing 12. To this end, a plurality of microswitches MS–1, MS–2 and MS–3, having movable blades electrically connected with the line conductor L–1, may be provided in position to be selectively actuated, as by cam means on the shaft 19. The switch MS–1 may comprise a single-pole, double-throw switch having a pair of contacts CS and CR, respectively connected with the line conductor L–2 through pilot lamps LS and LR. The switch may be normally biased to connect the blade of the switch MS–1 with the contact CS. Switch actuating cam means SC–1 on the shaft may be arranged to throw the switch against its normal bias only when the shaft is shifted from its normally retracted position in which the source element 11 is supported in completely shielded condition at the central portion of the housing 12, the same comprising the safe position of the apparatus. The lamp LS, accordingly, will be energized when and so long as the shaft and source carrying wheel are in said safe position.

Whenever the shaft is displaced from such safe position, the blade of the switch MS–1 will be moved by the shaft mounted cam means into engagement with the contact CR, thereby energizing the lamp LR to indicate that the apparatus is in ray emitting condition and hence, hot or dangerous. If desired, a connection socket SR may be interconnected in parallel relation with the lamp LR between the contact CR and the line conductor L–2 in order to allow a signaling device of any desired character to be interconnected in the system for operation whenever the wheel 18 is displaced from the safe position in which the source disc 11 is entirely shielded against ray emission outwardly of the housing 12.

The switches MS–2 and MS–3 may comprise normally open switches, each interconnected to control the operation of lamps L–16 and L–29, cam means SC–2 on the shaft 19 being adapted to close the switch MS–2 and thereby energize the lamp L–16 when the wheel 18 is in position presenting the source disc 11 in the opening 16. In like fashion, cam means SC–3 on the shaft 19 may serve to close the normally open switch MS–3 and thereby energize the lamp L–29 whenever the wheel 18 is in position presenting the source disc 11 in registration with the emission port 29.

The system 60 may also include a timer device 67 connected between the line conductors L–1 and L–2 in series with a switch 68, operable to connect and disconnect the timer, an indicating pilot lamp 69 being interconnected in parallel with the timer to show whether or not the same is connected for operation. Also connected in parallel with the timer is the operating coil C–4 of a relay embodying the normally closed switch S–4a and a companion normally open switch S–4b, said normally open switch being interconnected in series with a normally open, manually operable timer switch 70, the switches S–4b and 70 being in parallel relationship with respect to the normally closed switch S–4a.

It will be seen from the foregoing that the apparatus may be actuated to present the source disc 11 in registration with the emission port 29 by closing the switches M–2 and M–3, thereby energizing the motor 49, the magnetic clutch 58 and the solenoid 59′. The solenoid 59′ serves to stop rotation of the wheel 18 when the desired position is reached; and the magnetic clutch serves to hold the wheel in such desired position after the motor 49 has become disabled and drivingly disconnected from the shaft 19. The magnetic clutch 58 and solenoid 59′ also may be disabled at will by manually opening the switch 64, whereupon the wheel 18 will be returned to the safe position determined by the stops 56 and 57, by action of the spring 55. Manually operable cranking means may also be provided on the shaft 19 for turning the wheel 18 to any desired position.

The apparatus may also be operated to present the source disc 11 at the opening 16 by closure of the switch M–1, thereby energizing the motor and magnetic clutch, the solenoid 59′ remaining inactive. Cooperating mechanical stop means 71 and 72 may be provided for halting the turning movement of the wheel 18 when the energy source is disposed at the opening 16. The source disc 11 may be returned from projected position at the opening 16 to the completely shielded safe position at any time by merely opening the switch 64.

In the event that it be desired to employ the timer 67 to determine the duration of the elapsed time interval while the source element 11 remains in registration with the port 29 or at the opening 16, the same may be adjusted to measure the desired interval and the switch 68 may be closed to interconnect the timer in the control system and simultaneously to energize the relay coil C–4 to open the switch S–4a and close the switch S–4b. Placing the timer in operation mechanically closes the normally open timer switch 70 by actuating the appropriate switch M–1 or M–2, or M–3. The system operates to initiate an irradiation interval by projecting the source element 11 into registration with the emission port 29 or at the opening 16. After the expiration of an exposure interval for which the timer 67 may have been adjusted, the switch 70 is opened by operation of the timer, thereby disabling the system and allowing the wheel 18 to be returned to the safe position determined by the stop means 56 and 57 under the influence of the spring 55.

Any suitable, preferred or convenient means may be provided for supporting the housing structure 12. As shown, the same may be tiltably mounted, as by means of axles 73 extending outwardly of the opposite sides of the housing, said axles, as shown, being secured on mounting plates 74 fastened to the housing wall portion 20 on diametrically opposite sides thereof. The axles 73 may be supported in any suitable or preferred bearing means. As shown, said axles may be received in bearings 75 formed in a carrying fork 76 comprising a beam having a medial portion fitted with an eye member 77 and depending legs carrying the axle bearings 75. Manually operable means, such as a hand crank 78, may be provided for tilting the housing 12 in the fork or frame 76 to any desired extent. The frame 76, of course, provides convenient means for suspending the housing upon any convenient overhead carrying means, such as a crane or other like carrying device.

As shown more particularly in FIG. 4 of the drawings, a wheeled cart 79 may be provided for receiving and supporting the housing 12 and the suspension fork 76 to facilitate the transportation thereof, said cart comprising a preferably rectangular frame 80 formed with upwardly facing half bearings 81 adapted to tiltably receive corresponding journals 82, which may be conveniently formed on the arms of the fork 76 outwardly of and concentrically with the axle bearings 75. The fork 76 accordingly may be supportingly mounted on the frame 80 by applying the journals 82 in the half bearings 81 and by resting the fork on the frame 80. When so applied, the eye 77 may be anchored on the frame 80, as by means of a holding bolt applied therethrough and into a bolt receiving block 83 on the frame 80. The housing 12, of course, may be tilted in the frame mounted fork to any desired angularity by operation of the hand crank 78. The frame 80 may be provided with anchoring feet 84 mounted on extensible jack screws 85 supported in screw housings 86 mounted on the frame, on opposite sides thereof, and preferably beneath the half bearings 81.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Energy ray emission apparatus comprising a housing for enclosing a ray emission source, and source mounting means shiftable in said housing for selectively supporting the ray source either in retracted position shielded against ray emission outwardly of the housing or in any selected one of a plurality of projected positions for ray emission outwardly of the housing.

2. Energy ray emission apparatus comprising a housing for enclosing a ray emission source, source mounting means shiftable in said housing for selectively supporting the ray source either in retracted position shielded against ray emission outwardly of the housing or in any selected one of a plurality of projected positions for ray emission outwardly of the housing, indicating means for showing the relatively shifted retracted and projected positions of said mounting means, and cam means movable with said mounting means for actuating said indicating means.

3. Energy ray emission apparatus comprising a housing for enclosing a ray emission source, said housing being formed with a pocket opening outwardly of the housing through a plurality of ports, and source mounting means shiftable in said pocket and normally urged in a direction therein to support the ray source in position shielded against ray emission outwardly of the housing, said mounting means being movable to any selected one of said projected positions in said pocket for ray emission outwardly of the housing at said port.

4. Energy ray emission apparatus comprising a housing for enclosing a ray emission source, said housing being formed with a pocket opening outwardly of the housing through a plurality of ports, and source mounting means shiftable in said pocket for selectively supporting the ray source either in retracted position shielded, by and between said housing and mounting means, against ray emission outwardly of the housing or in any one of several projected positions for ray emission outwardly of the housing at a corresponding one of said ports.

5. Energy ray emission apparatus comprising a housing for enclosing a ray emission source, said housing being formed with a pocket having a portal, at the side of the pocket and opening outwardly of the housing, said housing being also formed with a channel providing a port connected with said pocket at a location remote from said first mentioned portal and also opening outwardly of the housing, and a mounting wheel having a source carrying rim said mounting wheel and rim being turnably supported for rotation in said pocket for selectively presenting the source either in retracted positon shielded against ray emission outwardly of the housing or in projected position for ray emission outwardly of the housing either at said portal or through said port forming channel.

6. Energy ray emission apparatus comprising a housing for enclosing a ray emission source, said housing being formed with a pocket having a plurality of ray emission ports opening outwardly of the housing, and source mounting means shiftable in said pocket for selectively supporting the ray source in retracted position shielded against ray emission outwardly of the housing or in projected position for ray emission outwardly of the housing at any selected one of said ports.

7. Energy ray emission apparatus comprising a housing for enclosing a ray emission source, said housing being formed with a cylindrical pocket having a portal at the side of said pocket, said portal opening outwardly of the housing, said housing being also formed with a channel forming a port connected with said pocket, said port being located in angularly spaced relation with respect to said portal, said channel also opening outwardly of said housing, and a mounting wheel having a source-carrying rim turnably supported for rotation in said pocket for selectively presenting the source either in retracted position shielded against ray emission outwardly of the housing or in projected position for ray emission outwardly of the housing at said portal or at said port.

8. Energy ray emission apparatus comprising a housing for enclosing a ray emission source, said housing being formed with a pocket opening outwardly of the housing through two spaced ports, and source mounting means shiftable in said pocket for selectively supporting the ray source either in retracted position shielded, by and between said housing and mounting means, against ray emission outwardly of the housing or in projected position for ray emission outwardly of the housing at either of said ports, said source-mounting means comprising a hollow member formed of sheet metal, such as steel, and filled with ray absorbing material such as lead.

9. Energy ray emission apparatus comprising a housing for enclosing a ray emission source, source mounting means, biasing means normally urging said mounting means toward retracted position in said housing to shield the source against ray emission outwardly of the housing, and means operable to move the mounting means, against the influence of said biasing means, toward a selected one of several projected positions for ray emission from said source outwardly of said housing.

10. Energy ray emission apparatus comprising a housing for enclosing a ray emission source, source mounting means, biasing means normally urging said mounting means toward retracted position in said housing to shield the source against ray emission outwardly of the housing, means operable to move the mounting means, against the influence of said biasing means, toward a selected one of several projected positions for ray emission from said source outwardly of said housing, and holding means for retaining said mounting means in any such selected projected position.

11. A mounting capsule for a ray emitting energy source comprising a base having a cylindrical internally threaded cavity and an inturned circular flange defining an opening at an end of the cavity, a shell of ray transparent material forming a cup having side walls and a bottom for receiving a block of energy source material therein, the cup being sized to fit said opening with the bottom of the cup projecting outwardly of the cavity remote side of the circular flange, the side walls of said cup carrying outwardly extending lip means adapted to overlie and seat upon the cavity facing side of said flange, and a clamping plug formed for threaded engagement in said cavity and having a shoulder for clamping the lip means of the cup upon the flange of the base, and an end portion sized to fit within the cup and to hold an energy source block between said end portion of the plug and the bottom of the cup.

12. Energy ray emission apparatus comprising a housing forming a pocket for enclosing a ray emission source, a plurality of ray emission ports communicating with said pocket and opening outwardly of the housing, and source mounting means shiftable in said pocket for selectively supporting the ray source either in retracted position shielded again ray emission outwardly of the housing or in any selected one of a plurality of projected positions for ray emission outwardly of the housing through a corresponding one of said ports, said housing comprising a retaining shell of sheet metal, such as steel, said shell, around said pocket and said ports, being filled with ray absorbing material, such as lead.

13. Energy ray emission apparatus comprising:
   (a) a housing for enclosing a ray emission source;
   (b) source mounting means supported in the housing and movable to
   (1) a retracted position at which a carried source material would be shielded to prevent ray emission outwardly of the housing, or to
   (2) any selected one of a plurality of projected positions at which ray emission would be permitted outwardly of the housing;
   (c) indicating means to indicate the position occupied by the mounting means, and
   (d) cam means operable by the mounting means for actuating said indicating means.

14. Energy ray emission apparatus comprising:
   (a) a housing for enclosing a ray emission source, said housing having a plurality of apertures that define fine operating positions at which ray emission is to be selectively permitted outwardly of the housing;
   (b) mounting means within the housing for such a source;
   (c) supporting means for said mounting means, said supporting means permitting movement of the mounting means to move a ray emission source to a selected one of said operating positions or to a retracted position shielded against ray emission outwardly of the housing;
   (d) bias means to bias the mounting means toward retracted position; and
   (e) electro-mechanical power means for driving the source-mounting means to a selected operating position, said electro-mechanical power means including magnetic clutch coupling means for maintaining the driving connection closed against the force of the bias means while conditions are normal, said clutch coupling serving to decouple and open the driving connection upon occurrence of an abnormal condition, whereupon the bias means becomes effective to move the mounting means to said retracted position.

References Cited in the file of this patent
UNITED STATES PATENTS

| | | |
|---|---|---|
| 2,477,648 | Piggot et al. | Aug. 2, 1949 |
| 2,575,134 | Schultz et al. | Nov. 13, 1951 |
| 2,670,443 | Pennock et al. | Feb. 23, 1954 |
| 2,700,111 | Jacobs et al. | Jan. 18, 1955 |
| 2,719,926 | Procter et al. | Oct. 4, 1955 |
| 2,772,361 | Hiestand | Nov. 27, 1956 |
| 2,798,164 | Untermeyer | July 2, 1957 |
| 2,843,754 | Costello | July 15, 1958 |
| 2,876,363 | Forrer et al. | Mar. 3, 1959 |

UNITED STATES PATENT OFFICE
CERTIFICATE OF CORRECTION

Patent No. 3,025,402                                          March 13, 1962

Harold Berger et al.

It is hereby certified that error appears in the above numbered patent requiring correction and that the said Letters Patent should read as corrected below.

Column 12, line 25, strike out "fine".

Signed and sealed this 24th day of July 1962.

(SEAL)
Attest:

ERNEST W. SWIDER                                DAVID L. LADD
Attesting Officer                                      Commissioner of Patents